US009165283B2

(12) United States Patent
Scheidl et al.

(10) Patent No.: US 9,165,283 B2
(45) Date of Patent: Oct. 20, 2015

(54) METHOD AND SYSTEM TO PROCESS A REQUEST TO CREATE A COLLABORATIVE TASK

(75) Inventors: Stefan Scheidl, Dieburg (DE); Todor Stoitsev, Darmstadt (DE); Uwe Riss, Karlsruhe (DE)

(73) Assignee: SAP SE, Walldorf (DE)

( * ) Notice: Subject to any disclaimer, the term of this patent is extended or adjusted under 35 U.S.C. 154(b) by 2132 days.

(21) Appl. No.: 12/137,401

(22) Filed: Jun. 11, 2008

(65) Prior Publication Data

US 2008/0313281 A1    Dec. 18, 2008

(30) Foreign Application Priority Data

Jun. 13, 2007 (EP) .................................... 07011575

(51) Int. Cl.
  *G06F 13/00* (2006.01)
  *G06Q 10/10* (2012.01)
  *G06Q 10/06* (2012.01)
(52) U.S. Cl.
  CPC ................ *G06Q 10/10* (2013.01); *G06Q 10/06* (2013.01)
(58) Field of Classification Search
  CPC .. G06Q 10/10; G06Q 10/06; H04L 29/08072; H04L 29/06; H04L 29/06034; H04L 12/1822
  USPC ...................................................... 709/205
  See application file for complete search history.

(56) References Cited

U.S. PATENT DOCUMENTS

| 7,051,036 B2 | 5/2006 | Rosnow et al. |
| 2004/0221256 A1 | 11/2004 | Martin et al. |
| 2006/0070019 A1 | 3/2006 | Vishnumurty et al. |
| 2007/0074211 A1 | 3/2007 | Klug |
| 2008/0209417 A1* | 8/2008 | Jakobson ...................... 718/100 |
| 2009/0037912 A1 | 2/2009 | Stoitsev et al. |

OTHER PUBLICATIONS

"U.S. Appl. No. 11/831,507, Non Final Office Action mailed Mar. 31, 2011", 17 pgs.

"U.S. Appl. No. 11/831,507, Preliminary Amendment mailed Aug. 30, 2007", 8 pgs.

"European Application Serial No. 07011575.3, Extended European Search Report mailed Nov. 13, 2008", 3 pgs.

"European Application Serial No. 07011575.3, Response filed Feb. 5, 2009 to Extended European Search Report mailed Nov. 13, 2008", 28 pgs.

Agostini, Alessandra , et al., "Rethinking CSCW systems: the architecture of Milano", Cooperation Technologies Laboratory, DSI-University of Milano, Italy,(1997).

Duursma, Cuno , et al., "Task Model Definition and Task Analysis Process. KADS-II, Deliverable M.5, Verison 2.0", *Vrije University, Brussels KADSII /M5/VUB/RR/004/2.0*, (Aug. 8, 1994),1-51.

(Continued)

*Primary Examiner* — Robert B Harrell
(74) *Attorney, Agent, or Firm* — Schwegman Lundberg & Woessner, P.A.

(57) ABSTRACT

Embodiments include a system for providing an identification of a collaborative task. The system may include a communication unit and a processing unit. The communication unit may be configured to receive a request of a user to create the collaborative task and send task metadata to a further system. The processing unit may be configured to generate the task metadata. The task metadata may be a part of the collaborative task and identifying the collaborative task as a part of a process.

22 Claims, 14 Drawing Sheets

(56) References Cited

OTHER PUBLICATIONS

Grebner, O., et al., "Task Management Model", *The Social Semantic Desktop Nepomuk*, (Jun. 29, 2007),1-91.

Mori, G., et al., "CTTE: Support for Developing and Analyzing Task Models for Interactive System Design", *IEEE Transactions on Software Engineering*, 28(9), (Sep. 2002),1-17.

Oudshoorn, Michael J., et al., "Conditional Task Scheduling on Loosely-Coupled Distributed Processors", *The 10th International Conference on Parallel and Distributed Computer Systems*, The International Society for Computers and Their Applications. New Orleans, USA,(1997),136-140.

Sinnig, Daniel, et al., "Patterns, Tools and Models for Interaction Design", *MBUI 2004, Proceedings of the First International Workshop on Making model-based user interface design practical: usable and open methods and tools, 103*, Funchal, Madeira, Portugal,(2004),1-4.

Stoitsev, Todor, et al., "A Framework for Light-Weight Composition and Management of Ad-Hoc Business Processes", *Lecture Notes in Computer Science. Springer Berlin / Heidelberg, vol. 4849*, (Nov. 7, 2007),213-226.

"U.S. Appl. No. 11/831,507, Response filed Jul. 29, 2011 to Non Final Office Action mailed Mar. 31, 2011", 11 pgs.

"U.S. Appl. No. 11/831,507, Final Office Action mailed Sep. 20, 2011", 15 pg.

* cited by examiner

```
<!DOCTYPE HTML PUBLIC "-//W3C//DTD HTML 4.0 Transitional//EN">
<HTML><HEAD><TITLE>SUB ST TO Ein großer Task</TITLE>
<META http-equiv=Content-Type content="text/html; charset=iso-8859-1">
<META content=True name=ctmMailItem>
<META content=SendRequest name=ctmMailType>
<META content=2007-01-15_17:14:38_+01:00_requester_name.family@domain
name=ctmRootTaskID>
<META content=[2007-01-15_17:14:38_+01:00_ requester_name.family@domain]
name=ctmTaskGroup>
<META content=2007-01-15_17:19:06_+01:00_ requester_name.family@domain
name=ctmDialogueID>
<META content=2007-01-15_17:17:26_+01:00_ requester_name.family@domain
name=ctmParentTaskID>
<META content="" name=ctmParentMailID>
<META content=2007-01-15_17:19:06_+01:00_requester_name.family@domain
name=ctmMailID>
<META content=requester_name.family@domain   name=ctmRequesterEmailAddress>
<META content=recipient_name.family@sap.com name=ctmPerformerEmailAddress>
<META content=4501-01-01 name=ctmStartDate>
<META content=4501-01-01 name=ctmDueDate>
<META content="" name=ctmChildTaskID>
<META
content="2007-01-15_17:14:38_+01:00_ requester_name.family@domain, 2007-01-
15_17:17:26_+01:00_requester_name.family@domain"
name=ctmParentTaskPath>
<META content=False name=ctmConfidentialityReceived>
<META content=0 name=ctmPercentComplete>
<META content="" name=ctmStatus>   ...
```

Fig. 8

```xml
<?xml version="1.0"?>
<tasks>
  <task>
    <taskId>
       2007-01-15_11:29:36_+01:00_name.familyname@domain
    </taskId>
    <taskName>ROOT_TASK</taskName>
    <description><![CDATA[DESC_ROOT]]></description>
    <owner>
       <personId>name.familyname@domain</personId>
       <personName>Familyname, Name</personName>
    </owner>
    <subtask>
       <subtaskId>
          2007-01- 15_11:29:46_+01:00_name.familyname@domain
       </subtaskId>
       <subtaskName>SUBTASK_1</subtaskName>
       <subtaskDescription><![CDATA[DESC_1]]></subtaskDescription>
       <delegation>
          <personId>recipient1_name.family@domain</personId>
          <personName>Recipient1_family, Name</personName>
       </delegation>
       <delegation>
          <personId>recipientN_name.family@domain</personId>
          <personName>RecipientN_family, Name</personName>
       </delegation>
       <time>0</time>
    </subtask>
    ...
  </task>
  ...
</tasks>
```

Fig. 9

```
@Entity
@Table(name = "task")
@NamedQueries( {
        @NamedQuery(name = "task.findRoottasks", query =
"SELECT t FROM Task t WHERE t = t.rootTaskID"),
        @NamedQuery(name = "task.findTaskByMessage", query =
"SELECT t FROM Task t WHERE t.parentMailID = :message ORDER BY
t.ID DESC") })
public class Task implements Serializable, CTMDataObjekt {
...
```

Fig. 10A

```
@Stateless
@LocalBinding(jndiBinding = "CTMQueryTool/Local")
@RemoteBinding(jndiBinding = "CTMQueryTool/Remote")
public class CTMQueryToolBean implements CTMQueryTool {
    @PersistenceContext
    EntityManager em;

@SuppressWarnings("unchecked")
    public List<Task> findRootTasks() {
        return
this.em.createNamedQuery("task.findRoottasks").getResultList();
    }
```

Fig. 10B

```
@Id
@Column(name = "ID", unique = true, nullable = false, insertable =
        true, updatable = false)
public String getID() {
    return this.ID;
}
```

Fig. 10C

METHOD AND SYSTEM TO PROCESS A REQUEST TO CREATE A COLLABORATIVE TASK

CLAIM OF PRIORITY

The present patent application claims the priority benefit of the filing date of European Application (EPO) No. 07011575.3 filed Jun. 15, 2007, the entire content of which is incorporated herein by reference.

TECHNICAL FIELD

Embodiments relate generally to electronic data processing and more specifically to architecture of distributed computer systems.

BACKGROUND AND PRIOR ART

Entities such as large companies or organizations may face tasks that cannot be solved by standard processes. A standard process may be described as a process that can at least partially be defined in advance. For this, most of the process steps or requirements that have to be fulfilled are known or can be planned. A non-standard process may for example be solved by an ad-hoc workflow that is started by handing a first task to a first person. The definition of following tasks may depend on the outcome of the first task. Accordingly, the first person or colleagues of the first person may decide how to continue with the ad-hoc workflow.

For such collaborative processes that develop during the execution of process steps collaborative tasks may be used. A collaborative task may be formulated by a requester of the collaborative task and handed over to a recipient of the collaborative task. A collaborative task may require a flexible behaviour of the requester and the recipient when the collaborative task is modified or negotiated between the requester and the recipient. A collaborative process may be completed when a set of collaborative tasks is completed.

SUMMARY

Embodiments address how to support a collaborative task in an efficient and flexible way. A collaborative task that is supported may be recorded, tracked, and accessible by parties not directly involved in the collaborative task. Such a collaborative task may become an object handled by a computer system and be more that an informal agreement between the requester and the recipient.

An efficient support may for example mean that parties contributing to the collaborative task can use standard application programs for example for communicating or organizing the work. This is efficient because the parties may not be required to use and learn a completely new tool. A completely new tool may lead to user errors, may not be integrated in the usual work of a party, and may not be accepted by a party. A flexible support may for example mean that the support does not substantially affect the flexibility to define and handle a collaborative task compared to an unsupported collaborative task. Furthermore, a support of a collaborative task by a computer system may allow for a reuse of information available from previous collaborative tasks.

An embodiment is a system for providing an identification of a collaborative task. The collaborative task may be supported when the collaborative task is assignable to a process. The identification of the collaborative task may be a contribution to assigning the collaborative task to a process and therefore to supporting the collaborative task. The system may contribute to an efficient and flexible support by generating metadata for the task and sending the metadata to, for example, a task management system. Therefore, a user may be able to use a standard tool in flexible way without being affected substantially by the support of the collaborative task. Furthermore, the support of the collaborative task may be distributed to different distributed systems. The system for providing the identification may be one of the distributed systems. The distributed systems may be able to provide a support of the collaborative task when one of the distributed systems is not available. Furthermore, the distributed systems may be used to reduce storage requirements of involved systems because redundant data storage may be prevented.

A further embodiment is a system for assigning a collaborative task to a process. The system for assigning the collaborative task may receive the metadata that identify the collaborative task and accordingly assign the collaborative task and store the metadata and the assignment of the collaborative task. The system for assigning a collaborative task may contribute to an efficient and flexible support of the collaborative task by enabling a party to use a standard application program without affecting the standard application program. As an example, the standard system may not be required to assign the collaborative task and to store data. Furthermore, the system for assigning a collaborative task may be able to provide functionality that is accessible independently of the standard application programs. Furthermore, the system may be a central system in a set of distributed systems and provide central functionality to more than one system of the distributed systems. This may be efficient with respect to storage requirements by preventing redundant data storage in different locations. It may also be efficient with respect to computing resources because such a central system may be selected so that the functionality is provided within an average response time. Therefore, a distribution of the systems that include the system for providing an identification and the system for assigning a collaborative task may be used to contribute to an efficient and flexible support.

A further embodiment is a method for providing an identification of a collaborative task. Features of the method correspond to features of the system for providing an identification of a collaborative task. Accordingly, the method contributes to supporting a collaborative task in an efficient and flexible way.

A further embodiment is a method for assigning a collaborative task to a process. Features of the method correspond to features of the system for assigning the collaborative task to a process. Accordingly, the method contributes to supporting a collaborative task in an efficient and flexible way.

A further embodiment is a computer program product for providing an identification of a collaborative task. The computer program product incorporates features of the method for providing an identification of a collaborative task. Accordingly, the computer program product contributes to supporting a collaborative task in an efficient and flexible way.

A further embodiment is a computer program product for assigning a collaborative task to a process. The computer program product incorporates features of the method for assigning a collaborative task to a process. Accordingly, the computer program product contributes to supporting a collaborative task in an efficient and flexible way.

BRIEF DESCRIPTION OF DRAWINGS

FIG. 8 is a code piece with example task metadata according to an embodiment.

FIG. 9 is a code piece with an example description of a task pattern according to an embodiment.

FIG. 10A is a code piece with an example query in a database table of a data storage system according to an embodiment.

FIG. 10B is a code piece with an example data retrieval from a database table of a data storage system according to an embodiment.

FIG. 10C is a code piece with an example retrieval of a task identifier from a database table of a data storage system according to an embodiment.

DETAILED DESCRIPTION

The following description of examples includes details for illustrating embodiments and is not intended to limit the scope of the embodiments or to be exhaustive. For purposes of explanation, specific details are set forth in order to provide a thorough understanding of example embodiments. A person skilled in the art may appreciate that further embodiments may be practiced with details that differ from the specific details.

Figure 1:
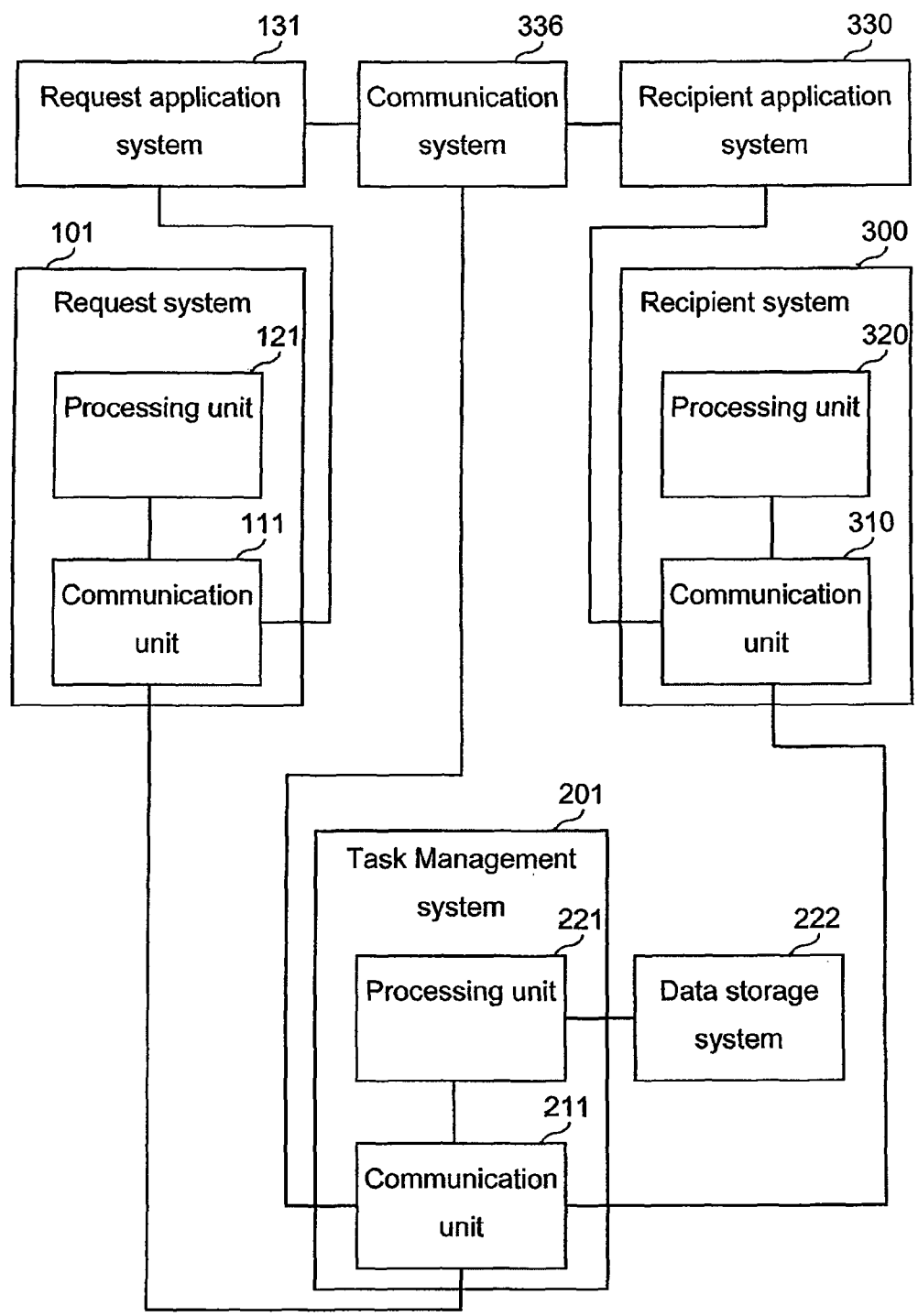
FIG. 1 is a block diagram of example systems according to embodiments and how the example systems communicate with each other.

FIG. 1 is a block diagram of example systems according to embodiments and how the example systems communicate with each other. The example systems include a request system 101 that embodies a system for providing an identification of a collaborative task. The request system 101 has a communication unit 111 and a processing unit 121. The example systems include a task management system 201 that embodies a system for assigning a collaborative task to a process. The task management system 201 has a communication unit 211 and a processing unit 221. Furthermore, a recipient system 300 with a communication unit 310 and a processing unit 320 may or may not be a system according to an embodiment. Further systems include the request application system 130, the recipient application system 330, the communication system 336, and the data storage system 222. Lines between systems or units of systems represent a communicative coupling configured to transfer data in either direction.

The communication unit 111 of the recipient system 101 may be configured to receive a request of a user to create the collaborative task. A collaborative task may be defined as a task that is created by a person, that is, a requester and is addressed to a further person, that is, a recipient to fulfill the collaborative task. In an example, the request of the user is received from the request application system 131 that may provide a user interface to the user. The request application system 131 may be a standard application program of the user and data such as the request may be provided by interfaces of the standard application program. An example of such an interface may be an application program interface (API) of the request application system 131. The standard application system 131 may provide standard functionality to the user such as sending or receiving emails or creating personal tasks to be fulfilled by the user.

The communication unit 111 may be further configured to send task metadata to a further system such as the task management system 201. In an example, the task metadata may be transferred in a more direct connection to the communication unit 211 of the task management system 201 using for example an internet or intranet connection. In a further example, the task metadata may be transferred using the connection to the request application system 131 that is connected through the communication system 336 to the communication unit 211. In a further example, both connection types may be used or combined with further connection types.

The processing unit 121 of the recipient system 101 may be configured to generate the task metadata for the requested collaborative task. The task metadata may be or may become a part of the collaborative task and may identify the collaborative task as a part of a process. Examples of task metadata include identifiers of the user of the request system 101 according to an internal or external identification standard. Further examples of task metadata may include: identifiers of the collaborative task using a task creation time or task request time, global unique identifiers (GUIDS), and when a prior collaborative task of the process exists also data locating the collaborative task such as identifiers of a root collaborative task or a parent collaborative task. The process may be identified in the metadata using identifiers of further tasks that represent a further part of the process. The further tasks may, for example, be previous collaborative tasks that are already assigned to the process. In a further example, an identifier of the process may be used that may be generated or that may be identical to a title or a name of the process. When the process is a new process or the collaborative task is the root task of the process the metadata may include a newly generated identifier of the process.

The request system 101 may include as hardware a computer system such as a personal computer (PC), a server, a plurality of servers configured to execute software programs, or a mainframe computer system. The request system 101 may include a client and a server related according to a client-server architecture or may include one or more peer computers arranged in a peer-to-peer or distributed architecture. In a further example, the request system 101 may include a plurality of individual computer systems that are connected by the Internet or by an intranet of an entity such as for example a company or an organization.

The hardware of the request system 101 may run, for example by hosting and executing, a program that configures the request system 101 to have characterizing features. Components of the request system 101 may include software units that represent encapsulated or distributed instructions. Such software units may be executed by the hardware of the request system 101 and may provide characterizing features of the units. One or more units of the request system 101 may be designed as a web application.

The request system 101 may be part of a computer system that hosts also the request application system 131. In a further example, the request application system 131 may be a separate computer system with hardware similar to or different from the hardware of request system 101.

The communication unit 211 of the task management system 201 may be configured to receive the task metadata of the collaborative task.

The task management system 201 may be embodied by a computer system that may be identical to, similar to, or different from the hardware of the request system 101. Furthermore, the task management system 201 may be hosted on a computer system that also hosts the request system 101.

The processing unit 221 may be configured to parse the task metadata and to assign the collaborative task to a part of the process. A part of the task metadata may identify the part of the process that is associated to the collaborative task. Such an association may include an identifier of the process and a location of the collaborative task within the process. The location may include for example a previous task that is specified as a parent task of the collaborative task. The processing unit 221 may then execute an assignment of the collaborative task by relating the collaborative task to further collaborative tasks of the process. The processing unit 221 may further add data representing the collaborative task to a data object representing collaborative tasks of the process or of a part of the process. The processing unit 221 may be further configured to update data that describe the process in the data storage system 222. The data that describe or represent the process may be updated with data from the task metadata and with data specifying that the collaborative task is assigned to the part of the process. In a further example, the data storage system 222 may also be connected to the communication unit 211.

The data storage system 222 may be a database server for example for a relational database. In a further example, the data storage system 222 may be a file storage system or a further type of computer system configured to store and retrieve data.

The communication system 336 may for example be a standard communication system such as a mail server, an Internet server, or an Internet or intranet site configured to exchange messages. The communication system 336 may be a system separate from the task management system 201 or an internal system or component of the task management system 201. The communication unit 211 of the task management system 201 may scan the communication system 335 to identify and request a receiving of new or updated task metadata.

The recipient system 300 with the communication unit 310 and the processing unit 320 may be similar or different from the request system 101 with the corresponding components. In an example, the recipient system 300 may be according to an embodiment and thus be able to provide an identification of a further collaborative task. The further collaborative task may be a subtask of the collaborative task received from the request system 101. In a further example, the recipient system 300 may be different from an embodiment and functionality for participating in the collaborative task may be provided by the task management system 201.

The recipient application system 330 may be a standard program of a user using also the recipient system 300. The recipient application system 330 may be similar or identical to the request application system 131.

Figure 2:
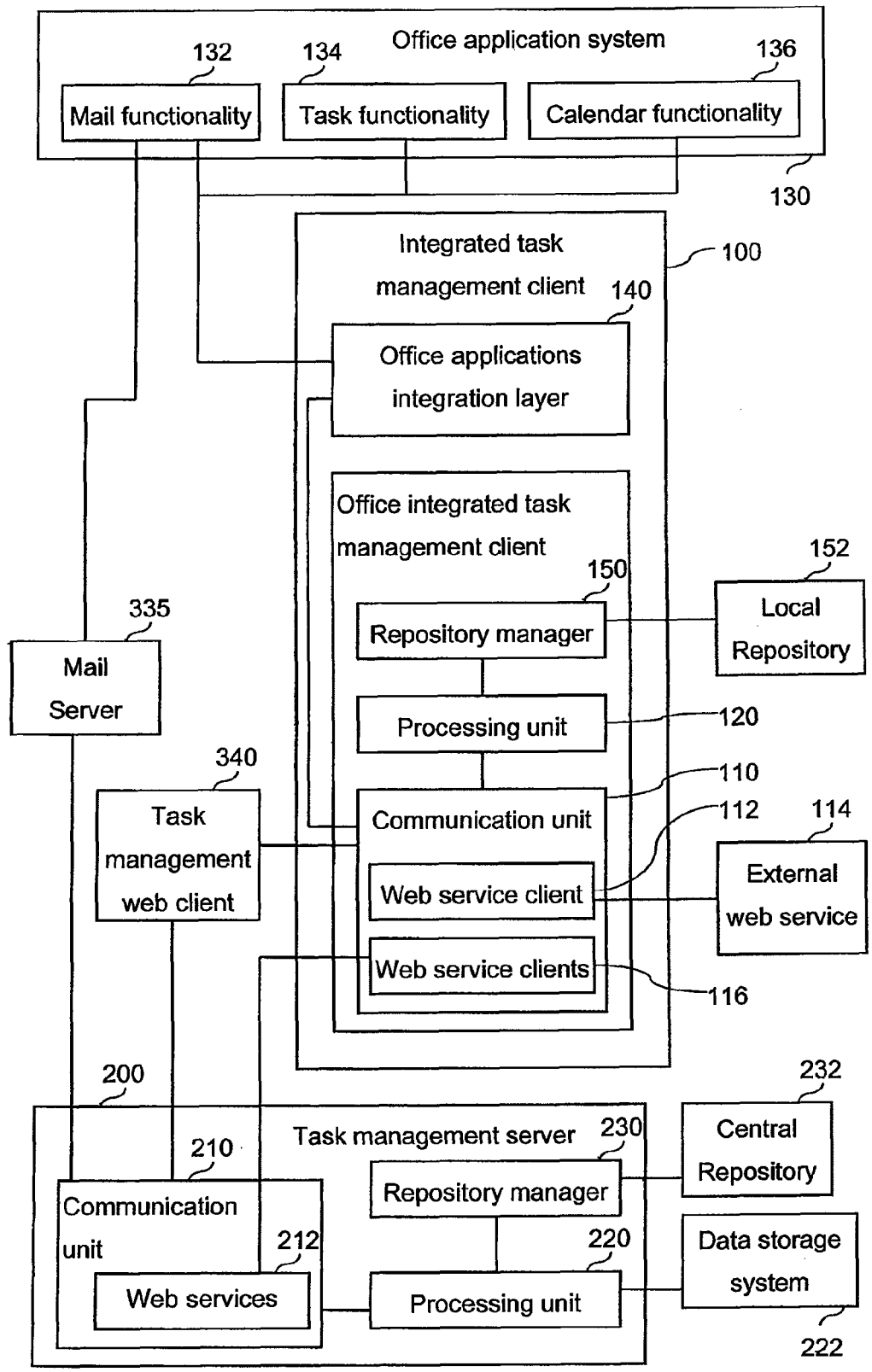
FIG. 2 is a more specific block diagram of example systems according to embodiments and how the example systems communicate with each other.

FIG. 2 is a more specific block diagram of example systems according to embodiments and how the example systems communicate with each other. The example systems include an integrated task management client 100 (see FIG. 1) embodying the system 101 (see FIG. 1) for providing the identification of a collaborative task. In an example, the integrated task management client 100 has the communication unit 110 with the web service client 112 connectable to the external web service 114. The communication unit 110 further includes one or more web service clients 116 connectable to one or more web services 212. The integrated task management client 100 has the processing unit 120, an office applications integration layer 140, and the repository manager 150 coupled to the local repository 152. The example systems include a task management server 200 embodying a system 210 (see FIG. 1) for assigning a collaborative task to a process. The task management system 200 has the communication unit 210 with the one or more web services 212, the processing unit 220, and the repository manager 230 coupled to a central repository 232. Furthermore, an office application system 130 embodying the request application system 131 (see FIG. 1) includes a mail functionality 132, a task functionality 134, and a calendar functionality 136. Further systems include a mail server 335 embodying the communication system 336 (see FIG. 1), a task management web client 340, and the storage system 222 (see FIG. 1).

In an example, the collaborative task may further include a description of the collaborative task and an assignment of a party such as a user of the recipient system 300 (see FIG. 1) to the collaborative task. The description may have been created by a user of the office application system 130 using for example standard mail functionality 132 that the user knows from everyday work. The user may also use standard task functionality 134 or standard calendar functionality 136 that may configured to create own tasks in the standard version. However, the office applications integration layer 140 may add functionality to standard components of the office application system 130 so that collaborative tasks are accessible from a standard component. In an example, a message with the collaborative task may be sent to the party using for example an email program providing the mail functionality 132. The user may have created a first request for creating the collaborative task or a subsequent request for creating the collaborative task in a course of a negotiation with the recipient. The user of the office application system 130 and the integrated task management client 100 may be identified as the requester of the collaborative task. The party to which the message with the collaborative task is sent may be identified as the recipient of the collaborative task.

The communication unit 110 of the integrated task management client 100 may be configured to receive metadata of a response message that has been sent by the party, that is, the recipient to the user. The communication unit 110 may be further configured to send further task metadata and a status of the collaborative task to the task management server 200. The processing unit 120 may be configured to generate the further task metadata and to compute the status of the collaborative task from the metadata of the response message.

In an example, the response message may include a decline of the collaborative task with a suggestion of an acceptable collaborative task. A status of the collaborative task may be declined task. The requester, that is, the user of the integrated task management client 100 may create a new collaborative task according to the suggestion. The processing unit 120 may generate further task metadata by modifying the task metadata of the original collaborative task or creating completely new data. A status of the new collaborative task may be: task suggested by recipient or new task.

In an example, the communication unit 110 may be configured to receive task metadata of a further collaborative task to which the user, that is, the requester is assigned. In such an example, the requester of a collaborative task is also a recipient of a collaborative task. The further collaborative task, for example, a prior collaborative task may be assigned to a process that is identical with the process to which the collaborative task is assigned. The communication unit 110 may be configured to receive a response of the user to the prior collaborative task. The response may include for example an acceptance of the prior collaborative task. The communication unit 110 may be configured to send a status of the prior collaborative task to the task management server 200. The processing unit 120 may be configured to compute the status of the prior collaborative task from the task metadata of the prior collaborative task and the response of the user. In an example, the status of the prior collaborative task may be accepted task. The processing unit 120 may use metadata of the prior collaborative task to generate the metadata of the collaborative task. For this, also an input of the user of the integrated task management client 100 may be used. The user may for example specify that the collaborative task is a sub-task of the prior collaborative task or created in response to the prior collaborative task. In a further example, forwarding an email or reusing a title or name of the process may be used to generate the metadata of the collaborative task.

A status of a collaborative task may be computed by parsing the collaborative task or a response to the collaborative task. A status of a collaborative task may also be computed by obtaining a response directly of the user of the integrated task management client 100. For this, the user may for example press a button for creating, accepting, declining, negotiating, or modifying a collaborative task or accepting or declining a completion of the collaborative task. Such buttons may be generated according to the phase of a collaborative task through plug-ins or add-ons in a user interface of any one of the components of the office application system 130. In an example, a recipient of a collaborative task may be receive an email from a requester and that email may have specifically generated buttons for accepting and declining the collaborative task. Such buttons are examples of added functionality to standard components of the office application system 130 so that collaborative tasks are accessible from a standard component. The standard components of the office application system 130 may include any one of the mail functionality 132, the task functionality 134, and the calendar functionality 136. In a further example, such buttons may be outside the user interface of the office application system 130, for example in a separate user interface of a computer system.

In an example, the communication unit 110 may be further configured to send an identification of a selected process to the task management web client 340. The communication unit 110 may be configured to receive task delegation data from the task management web client 340. The task delegation data may identify one or more collaborative tasks of the selected process, further tasks, relations between collaborative tasks or further tasks, and parties assigned to the one or more collaborative tasks. The task delegation graph may be structured as a task tree. The task management web client 340 may be used to obtain an overview of the selected process. In the task management web client 340, an access control of a user may be implemented and only parts of the selected process may be revealed. The revealed parts may be according to the role or identity of the user of the integrated task management client 100.

The integrated task management client 100 may include the repository manager 150 that is configured to access a task pattern stored by a local repository 152. A task pattern implemented as a tree structure of the collaborative tasks belonging to a process and including task context information. The local repository 152 may be external to the integrated task management client 100 or may be a part of the integrated task management client 100. The repository manager 150 may be configured to transform the task pattern into a standard format following an access of the task pattern. Furthermore, the repository manager 150 may be configured to transform a task pattern from a standard format into a storage format so that the task pattern may be stored in the local repository 152. The communication unit 110 may provide the task pattern in the standard format to the user. The processing unit 120 may add data from the task pattern in the standard format to the metadata of the collaborative task in response to a selection of the user. The task pattern may identify a further process, a collaborative task of the further process and a party assigned to the collaborative task of the further process.

In an example, the user of the integrated task management client 100 being a requester of the collaborative task may request information about a different collaborative task that he has worked on previously. The user may remember sufficient information about the previous collaborative task to search and identify the previous collaborative task stored in the local repository 152. As a result the user may send a message with the collaborative task to a party to which also the previous collaborative task has been sent. The user may also reuse a description of the previous collaborative task and further information that have been stored locally. Such a reuse of data may include that the processing unit 120 adds data from the retrieved task pattern related to the previous collaborative task by using for example drag and drop or cut and paste. In a further example, the user of the integrated task management client 100 may also use the repository manager to access information when the user is a recipient of a collaborative task.

A user of the integrated task management client 100 may also access information about task patterns that are stored in the central repository 232. For this, the communication unit 110 includes one of one or more web service clients 116 that are configured to access one of the web services 212 of the task management server 200. The one web service client may send a request of a task pattern to one of the web services 212 and receive the task pattern in a standard format. The communication unit 110 may provide a representation of the task pattern in the standard format to the user. The processing unit 120 may add data from the task pattern in the standard format to the metadata of the collaborative task in response to a selection of the user. The task pattern may identify a further process, a collaborative task of the further process and a party assigned to the collaborative task of the further process. In a further example, the task pattern may include much more information such as descriptions of collaborative tasks or number of hours required for completing a collaborative task. Such task patterns may be searched for example by using key words or by using identifiers of employees of a company.

The office applications integration layer 140 embodies an integration layer that is configured to transfer the request of the user from the office application system 130 to the communication unit 110. The office applications integration layer 140 may further transfer the task metadata from the communication unit 110 to the application system 130. The office applications integration layer 140 may use plug-ins or interfaces of application programs to obtain data transfers.

In the example, the application system 130 may send messages in a standard message format to a party that is assigned to the collaborative task. Furthermore, the integration layer 140 may add the task metadata of the collaborative task to a message sent by the application system 130. The task metadata may be added as text to the message, for example an email or may be added by reference through a link to an Internet or intranet site.

The communication unit 110 may use one of the one or more web service clients 116 to access one of the web services 212 and to transfer the task metadata of the collaborative task from the communication unit 110 to the task management server 200.

The communication unit 110 may have a web service client 112 that is configured to access an external web service 114 and to receive external service data from the external web service 114. The external service data may be a part of the collaborative task or may be related to a specified collaborative task. The external service data may be any one of a group of computed results for the specified collaborative task. The group of computed results may include: a cost calculation for the specified collaborative task, a calculation of a number of hours committed to the specified collaborative task, and a number of hours completed for the specified collaborative task.

The communication unit 210 of the task management server 200 may be configured to send task metadata of a collaborative task to a party that is assigned to the collaborative task. Such an alternative way to send the task metadata may be used when the party assigned to the collaborative task has a system that may not be able to process or display the task metadata sent in a message. In an example, requester of a collaborative task may send an email with a description of the collaborative task. The task management server 200 may be able to identify the recipient of the collaborative task as a party that uses a standard email system because the recipient is not listed in a specific group of users. The task management server 200 may send a further email with a link to the recipient. The link may be selected to open a Web browser that provides functionality specific to the collaborative task such as buttons to accept the collaborative task or decline the collaborative task. The response of the recipient may be forwarded to the requester and a following negotiation between the requester and the recipient may be supported by an exchanged of task metadata through the communication unit 210.

The communication unit 210 may be further configured to receive an identification of the party being a recipient for example from the requester of a collaborative task.

The processing unit 220 may be configured to identify a party being a recipient by accessing data of the collaborative task stored in the data storage system 222. The processing unit 220 may modify the task metadata of the collaborative task by adding an assignment of the identified recipient to the collaborative task.

The communication unit 210 may be configured to send a message in a standard message format to a party being a recipient. The message may include an identification of a location to access a representation of the task metadata for example using a link.

The communication unit 210 may be configured to receive the task metadata by accessing a message communication system such as the mail server 335. This may be done by scanning the mail server 335 for new messages sent by a user of an integrated task management client and looking for identifiers of task metadata in the new messages.

The communication unit 210 may be configured to receive an identification of a selected process from a task management web client 340 and to send task delegation data to the task management web client 340. The processing unit 220 may be configured to retrieve the task delegation data from the data storage system 222 using the identification of the selected process. The task delegation data may identify one or more collaborative tasks of the selected process and parties assigned to the one or more collaborative tasks.

The task management server 200 may include a repository manager 230 for accessing a task pattern stored by the central repository 232. The repository manager 230 may be configured to transform the task pattern into a standard format. The access of the task pattern may be in response to request received by the communication unit 210 for the task pattern from a request system such as the integrated task management client 100. The communication unit 210 may provide the task pattern in the standard format to the request system. The task pattern may identify a further process, a collaborative task of the further process and a party assigned to the collaborative task of the further process.

The communication unit 210 may include one of one or more than one web services 212. The one web service may be configured to receive the request for the task pattern from one of the one or more web service clients 116. The communication unit 210 may then provide the task pattern in the standard format to the one web service client.

The communication unit 210 may have web services 212 one of which is configured to receive the task metadata of the collaborative task from one of the web service clients 116. In a further example, a task management server may have only one implemented web service to be connected to only one web service client. The one web service may be configured to provide one functionality or more than one functionality.

The communication between the integrated task management client 100 and the task management server 200 allows for an efficient and flexible way to deal with metadata. In an example, a requester may use the integrated task management client 100 to request a collaborative task for a recipient. The task metadata may be stored on the request system, that is, the integrated task management client 100 and the recipient system that may be according to an embodiment. The task management server 200 may receive the task metadata with all modifications when the collaborative task is negotiated. In case of acceptance of the collaborative task by the recipient the task management server 200 may process the metadata according to an embodiment. The collaborative task may then be visible to further parties that may or may not be related to the process to which the collaborative task belongs. In an example, the task management server 200 may be used as a backend system that stores at least temporarily final states of a collaborative task. In a further example, the task management server 200 may also store task metadata and data in an intermediate and unconfirmed state so that for example a recipient may access them using a Web browser. In a further example, collaborative tasks in an intermediate state may be displayed in a way that is different from a collaborative task in a final state. In an example, the requester and the recipient may not be aware of the task metadata. The requester and the recipient may see the task description in a current version and the subject, that is, a title of the collaborative task. Furthermore, the requester and the recipient may be able to see a due date of the collaborative task, a status of the collaborative task, or a percentage value how much of the collaborative task has been completed. A delegation graph provided by the task management web client may display information about the collaborative task or the process to which the collaborative task belongs to a party that has access rights to the delegation graph. In an example, the integrated task management client 100 may provide information only about a collaborative task in which the user of the integrated task management client 100 is involved as a requester or a recipient. In an example, a local part of a task pattern may only be stored locally in the local repository 152 when the user of the integrated task management client 100 presses a specific save button. A local part of the task pattern may include one or more collaborative tasks in which the user is involved. However, the task management server 200 may use the central repository to store updates of a task patterns of parties involved in a collaborative task of process related to the task pattern.

FIG. 2 can be described as a framework with following functional blocks: the application integration layer 140, the integrated task management client 100, the task management web client 340, the task management server 200 with mail server 355 that may be embedded or may not be embedded, the data storage system 222 for persisting task information and the task pattern repositories including the local repository 152 and the central repository 232 for storing reusable task structures. The functional blocks represent a composite task management system.

The application integration layer 140 may provide the interface between the office applications and the integrated task management client 100. The application integration layer 140 may be responsible for connecting to the provided office infrastructure and enabling the interoperability of the integrated task management client 100 with the office applications.

The integrated task management client 100 may provide a front-end that is integrated in the office applications infrastructure. The integrated task management client 100 interacts with the office applications through the application integration layer 140. As a central access point to the system, the integrated task management client 100 may provide also a link to the task management web client 340. The application integration layer 140 may ensure the appropriate storage and transfer of task specific data between the integrated task management client 100 and the office application infrastructure. The integrated task management client 100 may enable a user to save, edit and reuse task patterns, stored on local or remote task pattern repositories. The task management web client 340 provides front-end functionality for exploring the overall task delegation graph beyond the boundaries of the personal task management. The task management web client 340 may retrieve the task data from the task management server 200. The task management server 200 may provide the back-end functionality for the composite system. The task management server 200 may evaluate and stores or retrieves task data to and from the data storage. The task management server 200 may also provide a connection between different integrated task management clients and task pattern repositories. The data storage system 222 may be used to save all task relevant information. The data storage system 222 may be accessed by the task management server 200 in read-write mode.

The central repository 232 may store reusable task structures along with backup, versioning and history information. The central repository 232 may be accessed from repository specific manager plug-ins installed on the task management server 200, such as the repository manager 230. In a further example, the central repository 232 may also be directly connected to the client.

The integrated task management client 100 may be extended with unlimited number of web service clients. The web service clients may provide various functionalities concerning the data exchange with the task management server 200 but may also extend the integrated task management client 100 through external services for task specific operations. The integrated task management client 100 may also be extended with an unlimited number of task pattern repository managers. This would allow the integrated task management client 100 to operate on different kinds of task pattern repositories. When repository support is implemented on the integrated task management client 100 the installation on the integrated task management client 100 may be required to be updated for each new feature on the integrated task management client 100. This may require reinstallation of the integrated task management client 100 on multiple hosts. The task management server 200 may utilizes a web service that provides an interface for the task pattern repository handling to the client. So with each extension the repository management functionality may be updated on the server and all clients may be able to read the new repositories without further effort. Providing the repository manager 150 for file system repositories may enable a user of the integrated task management client 100 to handle locally exported task pattern and task pattern repository documents. Personal task pattern repositories to which only the user may wish to have access can also be implemented as file system repositories on the local integrated task management client 100.

In addition to the web server communication the task management server 200 may also use a mail server connection. It is used to facilitate task data exchange over email. The mail server may be embedded in the back-end or it could be an external mail server. The office solution mail client would deliver emails enriched with task specific data from the application integration layer 140 to the mail server. The task management server 200 may then fetch the messages from the server end evaluates the embedded task data.

The task management server 200 may save the task data in the data storage system 222, read and evaluate data from the data storage system 222 and deliver the data to the front-end.

One or more task pattern repositories such as the central repository 232 may be connected to the task management server 200. The task pattern repositories may store reusable task pattern structures and provide versioning and history for the patterns. The access to the task pattern repositories may be accomplished from the integrated task management client 100 through the task management server 200. Different security settings may be applicable for repository access so that repository data may be kept private and visible for restricted number of users that have sufficient access rights. The task management server 200 may manage the repositories information through repository specific managers. The task repositories may have different implementations and the task management server 200 may be extended with repository manager plug-ins for each repository type. The repository managers may be responsible for applying the security policies for repository access. The task management server 200 may be able to store new patterns passed by the integrated task management client 100. The task management server 200 may retrieve patterns on requests from the integrated task management client 100 based on provided pattern storage information. The methods for repository operations are well defined in a common interface between the task management server 200 and the integrated task management client 100. Therefore, the integrated task management client 100 may not need to adapt to different repository types because the data is delivered in a compatible form. The task pattern repositories may be used as persistent storages without access or data evaluation logic. The logic may reside in a repository manager 150 that may be installed on the task management server 200.

The application integration layer 140 may be responsible for enabling storage and delegation of tasks through a common office infrastructure such as an email client. The application integration layer 140 may adapt as much of the available office infrastructure for the purposes of the composite task management system as useful in order to ensure an unobtrusive character of the composite task management system. Furthermore, the application integration layer 140 may be responsible for transforming the task data coming from the integrated task management client 100 in standard format before passing it to an office system. This may ensure interoperability with diverse office systems that might not have an installation of the integrated task management client 100. For example, when a task is crated in the integrated task management client 100 and delegated to another person through sending an email, the composite task management system may not be installed at task recipient site. However, the message may be delivered in a standard format, for example, in Hypertext Markup Language (HTML) with the task specific attributes stored as meta content. The message may be still readable and fulfil the purpose to forward the assignment to the recipient. The delivered email message may also contain HTML standard links that trigger email response to the task requester by adding response type such as accept or decline as meta information. When the reply is returned to the task requester the application integration layer 140 may be able to recognize the meta content in the message and provide the option to handle the message as a collaborative task message. When a user selects the option the task specific meta content may be parsed and the appropriate delegated task may be updated in the integrated task management client 100.

The application integration layer 140 may be for example implemented as a COM add-in that is embedded in an Outlook application and provides extensions to the Outlook MailItem and TaskItem objects. Outlook is a software program provided by software vendor Microsoft. The application integration layer 140 may be integrated in the Outlook Mail and Task infrastructures and stores and transmits task specific data in the form of HTML meta content in emails. In further implementations of an integration layer, different software programs may be used that may or may not provide structures similar to add-ins. Furthermore, it may also be possible to use for example Web email programs to add collaborative task specific functionality.

The integrated task management client 100 may provide the front-end of the composite task management system within the office applications environment. The integrated task management client 100 may be the main entry point to the composite task management system. The integrated task management client 100 may include tree structures with task hierarchies and different task views, where the all relevant task information such as requester, recipients, status, due date are displayed. The integrated task management client 100 may provide a complete functionality for composing tasks, setting task attributes, and creating task hierarchies by adding and removing sub tasks.

The integrated task management client 100 may provide collaborative functionalities. Users can accept, negotiate, decline tasks or they can issue and reject completion declarations for a task. This dialog may be accomplished through sending task messages over the infrastructure described in the overview.

The integrated task management client 100 may provide functionality for task pattern management at the client side. A task pattern may be a tree structure of tasks, enriched with relevant task context information. A task pattern repository may be a structure that has one or more task patterns. The pattern management on client side may include one or more of the following operations: Apply a pattern to a selected task in the tasks tree to substitute the selected task in the integrated task management client 100 with the root task of the task pattern tree and supply the stored context information for all task tree nodes. Save a pattern from a selected task so that the task selected in the tasks tree becomes the root of a task pattern tree, the complete tree is stored along with the context information for each node. The pattern may be saved to the file system as a task pattern document or it may be stored in one of the task pattern repositories. Explore task pattern repositories and task patterns. For this, a task pattern explorer may be embedded in the integrated task management client 100. Information about the remote task pattern repositories may be delivered over the task management server 200. A task pattern explorer may also view local task pattern repositories and task pattern documents. Create or Remove task pattern repositories. Such operations may be executed on local or remote repositories where the appropriate repository manager is responsible for the actual implementation. The managers may deliver descriptive information about the type of repository so that the user may select what type of repository is created. Edit a task pattern. The user can select task patterns in the patterns explorer and open the task patterns so that a pattern editor is opened. Task patterns may be edited by adding, moving and removing tasks or changing task context information. Edited task patterns may be saved to the file system as a task pattern document or to a task pattern repository through the task pattern explorer. Export a task pattern from a task pattern repository to a local task pattern document or export a task pattern repository to a local repository document. This may be accomplished through the task pattern explorer. Copy task patterns between different repositories. Import a task pattern from a local file or task pattern repository to another task pattern repository. This may be accomplished through the task patterns explorer. View task pattern history to track how, when and from whom a task pattern was altered. This may be accomplished through the task/patterns explorer. Compose tasks and task pattern repositories. This may be done by creating new empty items and adding patterns from available repositories or task pattern documents. In this way new structures can emerge that combine content from different sources.

The integrated task management client 100 may call web services for example by issuing a call to a web service residing on the task management server 200 to refresh the status of a delegated task or to trigger status update. Web service clients may also refer to external web services. For example an external web service delivering an email list with partner email addresses may be called to add context information to a task.

The task management web client 340 may display a process overview by showing the task trees in a task delegation graph. The displayed task information may include context information such as description, status, and due date. The task management web client 340 may connect to the task management server 200 and query structures from the task management server 200. This may include applying certain constraints according to the permissions of the user viewing the task trees. The user role with the permissions may determine when the connection to a back-end is established and accordingly certain task sub-trees or complete user trees may not be displayed. The task management web client 340 may provide different views such as a tree view of all user tasks stored in the back-end and a graph view displaying the delegation scheme between the task trees of the different users.

The task management web client 340 may enable also collaborative mechanisms for displaying contributions to a task from different users. For example if user A is allowed to view the complete graph and hence also the sub tasks of D user A can contribute to a task of D by adding for example a note in the form of comment. The comment may then appear in the task context information when D views a task. User A may not be allowed to add context information to the task of D but may still be allowed to view this task in read-only mode.

The task management server 200 may have an implemented logic for evaluation, persistence and retrieval of task data. The task management server 200 may manage the connections to different components of the composite task management system and ensure exchange of information between the different components.

The connection to the data storage system 222 may be specific to a selected implementation approach. In an example, task management server 200 may be a java enterprise edition (EE) application with enterprise java beans (EJB), deployed on a JBoss java application server with a relational database (DB) like MySQL as the data storage system 222. The DB connection may be set up in the JBoss configuration and the access may be accomplished through the EJB logic.

The connection to the central repository 232 may be accomplished through repository specific management plug-ins such as the repository manager 230. Different task pattern repository types may require different connection and access. The configuration for the connection of the repository management plug-ins to the repositories may be described in plug-in specific configuration files. All repository data is parsed with the task management server 200 and delivered to the integrated task management client 100 over an interface so the client does not depend on the task pattern repository types. In the case of a task management server 200 as a java EE server application the repository plug-ins can be EJB or other java classes that provide access to the specific repository and are packed as modules in an application.

The task management server (TMS) 200 may also host a mail server. The mail server would be the target point for delivering mail messages with task specific content from the integrated task management client 100 and the application integration layer 140 through the office application system 130. The mail server may also be external to the TMS. In this case the task management server 200 may connect to the mail server as a client and retrieve the emails containing task data from there. The data is then evaluated and stored as usual.

The data storage system 222 may hold evaluated task relevant information. The data storage system 222 may be accessed from the task management server 200 in read-write mode. The actual implementation of the data storage system 222 may be a database or a file repository.

The central repository 232 may store task patterns along with backup and additional information to provide task pattern versioning and history. The central repository 232 may be organized for example as tables in a relational database, as a file system, or as a web based resources repository. One or more repositories may also be contained in the data storage system 222. Independently of a repository type each task pattern repository may use a certain structure. The structure of a single task pattern may be defined in a W3C endorsed grammar language such as DTD or XML Schema. A definition may be specified also for the structure of a complete task pattern repository. This allows the import and export of single task patterns and of complete task pattern repositories. A task pattern may be a single task or a task with sub tasks. Structure definitions for a task pattern and for a task pattern repository may be extended with the evolution of the pattern description and may be kept backward compatible. A task pattern repository may be able to supply the mandatory elements for the task pattern description schemas. A task pattern repository may be able to export a single task pattern or a complete task pattern repository structure in a document such as an XML document that may be compliant with an appropriate schema. The task management server 200 may be able to import the task pattern document into a repository by parsing the information and saving the information in the repository through the appropriate repository management plug-in.

Figure 3:
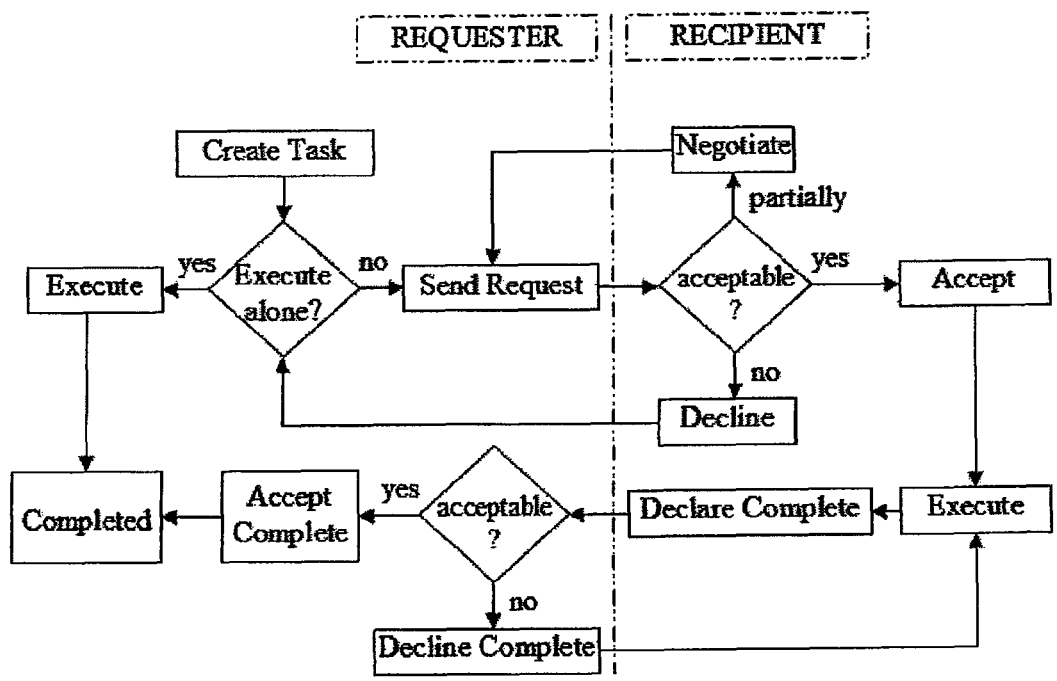
FIG. 3 is a flow diagram of an example communication process between a requester and a recipient of a collaborative task that is supported by example systems according to embodiments.

FIG. 3 is a flow diagram of an example communication process between a requester and a recipient of a collaborative task that is supported by example systems according to embodiments.

On the requester part of the flow diagram the collaborative process may begin with a process step "Create Task" for creating a task that may or may not be a collaborative task. The requester may create a task using the integrated task management client 100. If requester decides to execute on the task alone the process may continue with the task execution. The execution can generally be tracked in the system through changing the completion percents and adding comments to a task. If the requester decides to delegate a task rather than work on it alone a task request is sent to one or more recipients. They can then accept the task, negotiate or decline the task request. If the recipient negotiates the task the recipient may add comments or concerns and reply to the task requester. The requester may modify or clarify the task by adding information. The requester may send the updated task again as request to the recipient. This iteration may continue until the recipient has either accepted or declined the task. When the recipient declines a task the recipient may add an explanation about the declination. Following a decline the task may be sent again to the recipient. The requester may not be able to force the recipient to execute on a task so the requester of a declined task should either execute on the declined task himself or send a task request to a further recipient. When the recipient accepts a task an accept notification may be issued to the requester. The recipient can put additional information in this acceptance response. When a task is accepted the recipient executes on the task and may track the execution by changing the completion percents or by adding comments to the task. When the recipient has completed the task the recipient may issue a completeness declaration to the requester. The requester may accept or decline the completion declaration. If a completion declaration is declined the requester may send the task along with additional clarifications back to the recipient. The recipient may then continue with an execution on the task. This iteration may continue until the task requester has accepted the task completion declaration. When a completion declaration is accepted a notification may be issued to the task recipient. The notification may inform the task recipient that the task was indeed accepted as completed by the requester. The requester can put additional comments in the acceptance notification message. When the task completion declaration is accepted the task is marked as completed on the requester site and on the recipient site.

Figure 4A:
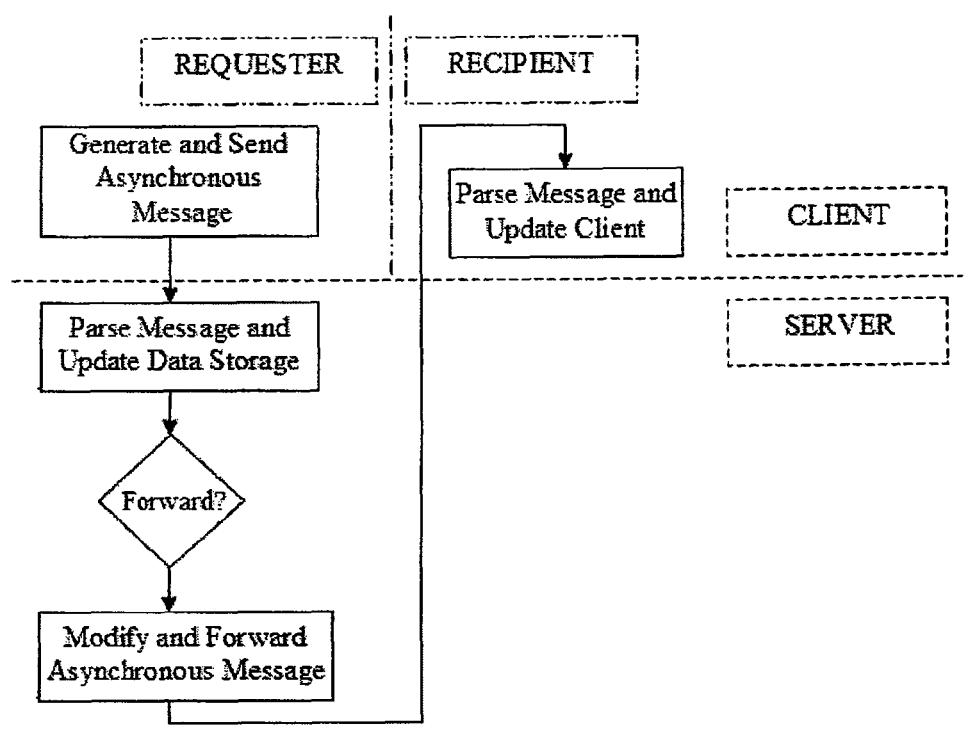
FIG. 4A is a flow diagram of an example centralized communication process between client systems according to embodiments and a server system according to an embodiment.

FIG. 4A is a flow diagram of an example centralized communication process between client systems according to embodiments and a server system according to an embodiment. In a centralized communication process data may be exchanged between the requester system and the recipient system each of which may be according to embodiments through task management server 200. In an example, data may be exchanged using asynchronous messages so that a party involved in the data exchange may work offline. In a further example, data may be exchanged using synchronous messages.

In an example, an operation on the front end using for example a component of the office application system 130 may result in changes of task data and lead to generation of a tracking message. The tracking message may be sent in an asynchronous communication to the task management server 200. The task management server 200 may evaluate the tracking message and update the task data in the data storage system 222. If the message includes a task request or describes task changes which require notification of one or more recipients the message may be modified and forwarded to the recipients. The recipient client application such as the integrated task management client 100 (see FIG. 2) may receive the message, parse the message, and update the local data accordingly.

Figure 4B:
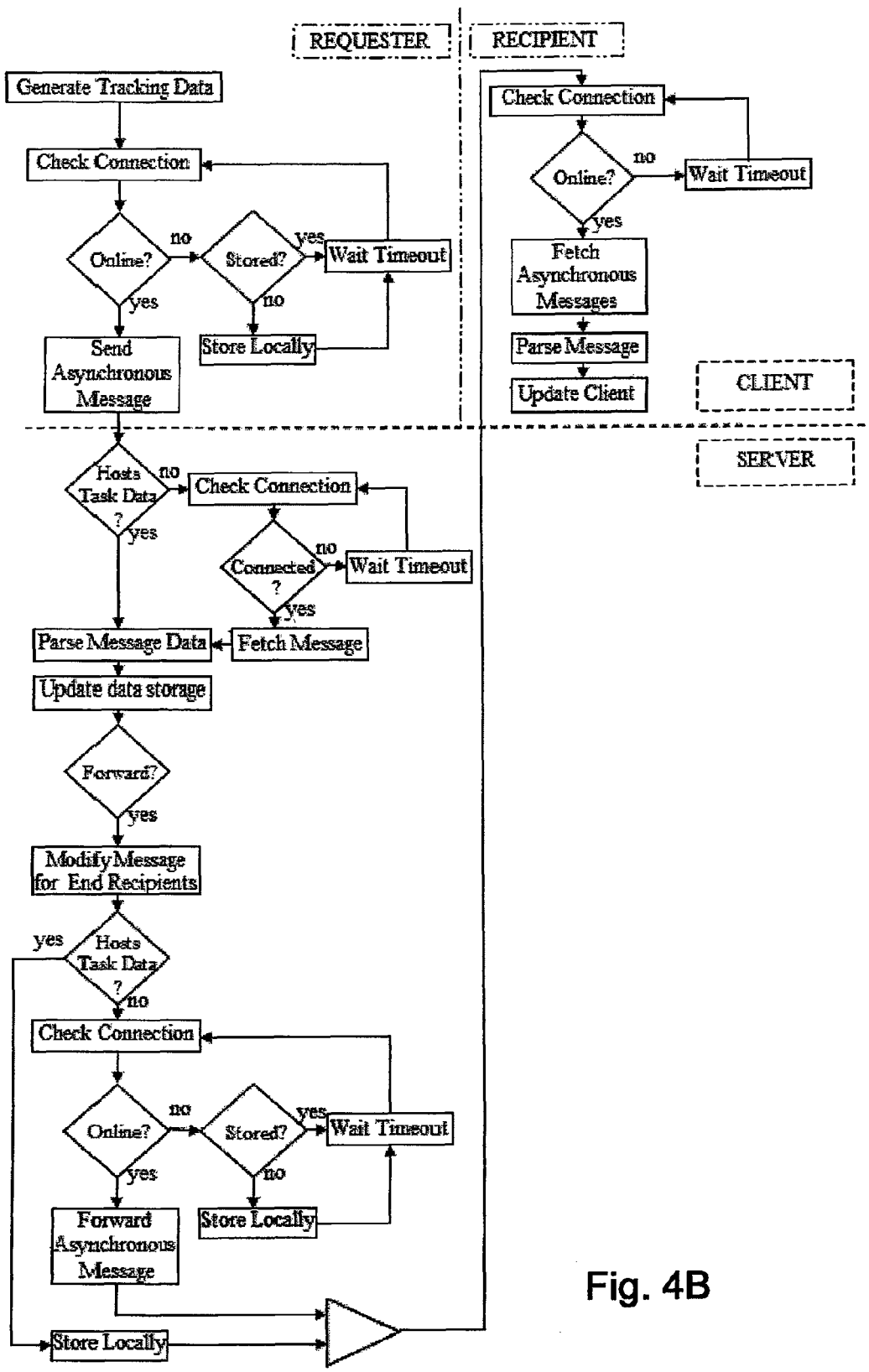
FIG. 4B is a more specific flow diagram of an example centralized communication process between client systems according to embodiments and a server system according to an embodiment.

FIG. 4B is a more specific flow diagram of an example centralized communication process between client systems according to embodiments and a server system according to an embodiment.

When a user involved in a collaborative process, that is, a requester or a recipient changes task data the client application system of the user may generate a tracking message. The client application system may include task management server according to an embodiment. A change of task data may include a change of task specific information on the client application system side such as creating a new task, updating an existing task, or creating a collaborative task event like a task delegation. The tracking message may contain task specific data and may be sent to the task management server in an asynchronous mode. The tracking message may be an email message with task metadata. The application framework in which the task management client is embedded may or may not support an offline mode. When an offline mode is not supported the task management client may be extended to store the message locally when the user works without a connection to the task management server 200. When the server connection to the task management server 200 is established the locally stored content may be sent asynchronously to the task management server 200.

The location to which the task management client sends messages with task data may vary according to the software infrastructure of the office applications and the network of the user. Accordingly, messages may be delivered directly to the task management server 200 so that the task management server 200 is the host of the task data delivery. The task management server 200 may be able to directly access and parse the messages. When messages are delivered to an external host such as an external mail server the task management server may attempt to connect and fetch the messages from the external mail server. The task management server 200 may parse the messages and update the task data in the data storage system 222 accordingly.

Messages may describe task requests to one or more recipients or may describe task changes for which notifications may be sent to multiple recipients. An example for such a task change may be a cancellation of a parent task in a task hierarchy. In this case the message data may be modified for delivery accordingly. A delivery to the recipients may be accomplished in an asynchronous mode. When the task management server 200 is not a host for the messages the task management server 200 may check the connection to the external messages host. When a connection is not available a formatted message may be stored locally until the formatted message can be delivered. When the task management server 200 is the host of the task messages the task management server 200 may store the messages so that a client application of a recipient can fetch them. The task management server 200 may deliver the messages using email services or web services. When a recipient goes online the client application of the recipient may fetch the stored asynchronous messages from the message host, for example, the task management server 200 or an external host. The message content may be evaluated and the client application may update locally stored data accordingly.

The task data may be exchanged according to the centralized communication process between the task management server 200 and the integrated task management client 100 or the task management web client 340. The data exchange between the task management server 200 and the integrated task management client 100 may use asynchronous message delivery and a local data storage system may be based on the email handling of the mail client. The data exchange between the task management server 200 and the task management web client 340 a user input and generated tracking data may be stored locally through a file system access from a signed java applet when a connection is broken. The communication between the task management web client 340 and the task management server 200 may be direct without involving other hosts because a web client may be deployed within the task management server 200.

Figure 5:
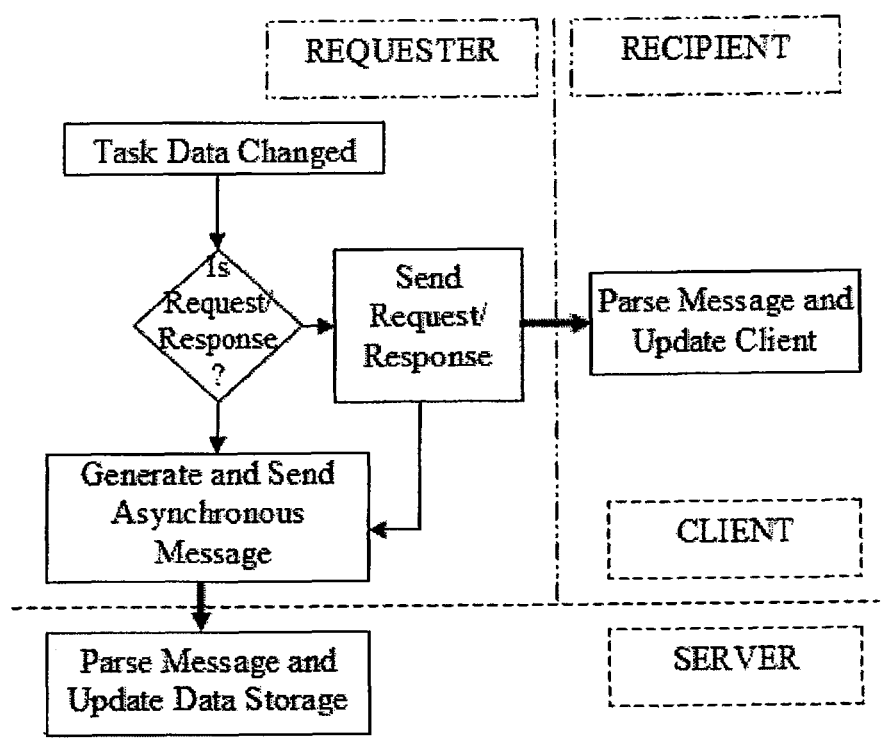
FIG. 5 is a flow diagram of an example decentralized communication process between client systems according to embodiments and a server system according to an embodiment.

FIG. 5 is a flow diagram of an example decentralized communication process between client systems according to embodiments and a server system according to an embodiment.

In a decentralized communication process the task management client 100 may send more than one message in a parallel mode. A message with the task description may be sent directly to one or more than one recipients. A tracking message may be sent independently to the task management server 200 to update the overall process status.

The decentralized communication may have further rules to deal with special event such as task cancellation. Such further rules may ensure that a recipient on a lower level in the delegation chain may receive a notification about a cancellation of a parent task when one of the upper level requester is offline. The system of the top level requester may not be able to issue a cancellation notification until the system is online and recipients on a lower level may continue executing on cancelled tasks.

Figure 6:
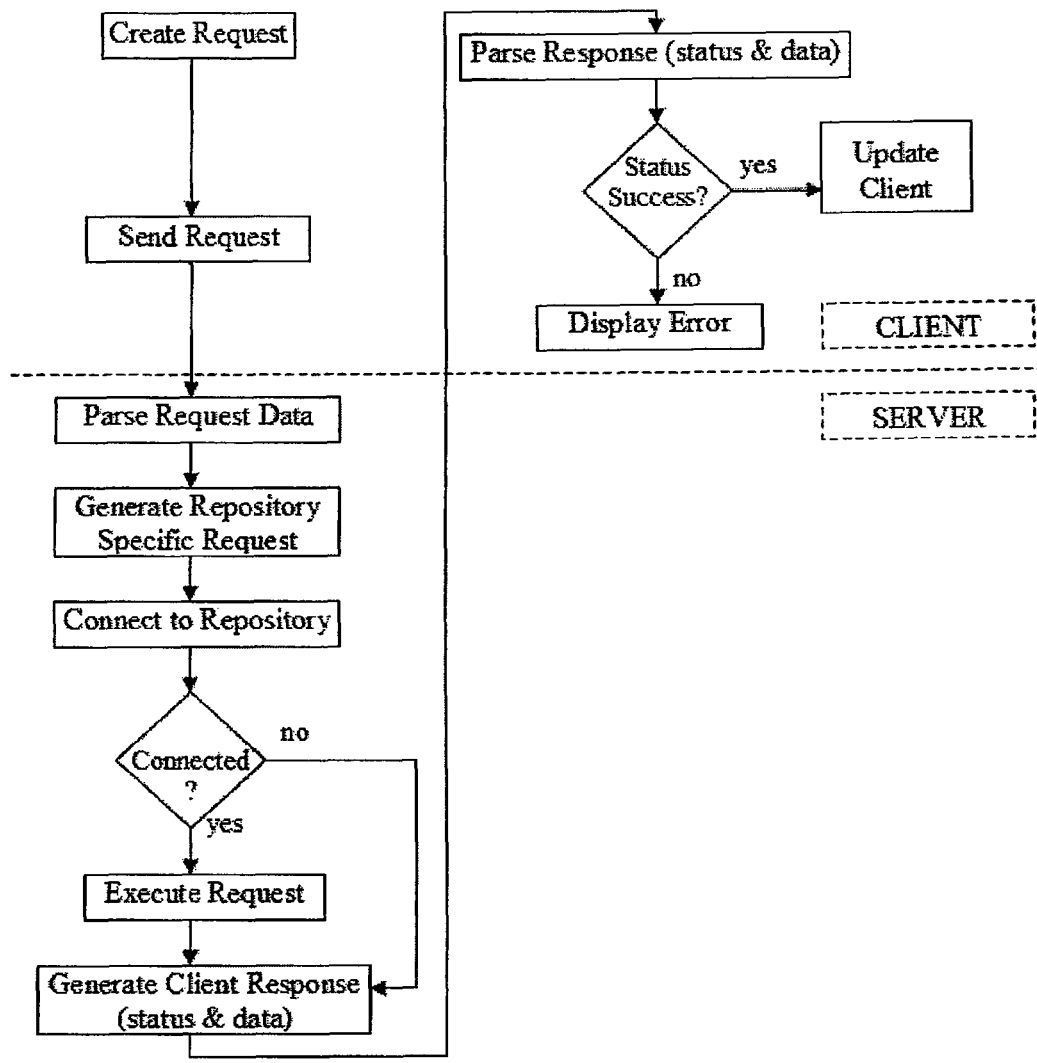
FIG. 6 is a flow diagram of an example process of accessing a task pattern repository connected to a task management server according to an embodiment.

FIG. 6 is a flow diagram of an example process of accessing a task pattern repository connected to the task management server 200 according to an embodiment. In an example, the task pattern repository may be identical to the central repository 232 connected to the repository manager 230 of the task management server 200.

Remote task pattern repositories can be accessed in online mode when the client has a connection to the task management server 200. An operation in a task management client such as the integrated task management client 100 may include browsing remote task pattern repositories in the repository explorer. Such an operation may further include editing repository content or generating a task pattern repository request. The task pattern request may be specific for each operation. The task pattern request may be sent to the task management server 200 using a repository management web service. The data may be parsed on server side.

A target repository and a target repository type may be evaluated using the content of the task pattern request. Common data structures or classes for task patterns and task pattern repositories representation may be generated in the task management server 200. Evaluated request data may be passed to the appropriate repository manager 230 along with the generated internal repository representation objects. The repository manager 230 may generate a repository specific request, for example, in case of a DB repository the repository specific request may be an SQL statement. For file system repositories no explicit formatting may be needed and the repository manager 230 may provide methods for read and write file accesses.

The repository manger may try to connect to a repository when a connection is not yet established. When a connection fails an appropriate failure status and error data may be returned to an integrated task management client. When a connection succeeds the repository manager 230 may execute the repository operation. A result may be initially held in common objects in the task management server 200 for task pattern and task pattern repository representation. The task management server 200 may generate response data for the task management client of the repository using the available internal objects structure. Generated compatible data may be sent to the task management client. The task management client may parse and evaluate the returned status and data. When a status denotes that a request has failed an error message may be displayed. Otherwise, a task management client may update the local data and the displayed data according to the result.

As an additional technique, caching can be implemented on a task management client side or on a task management server side to reduce communication processes related to a task pattern repository.

Figure 7:
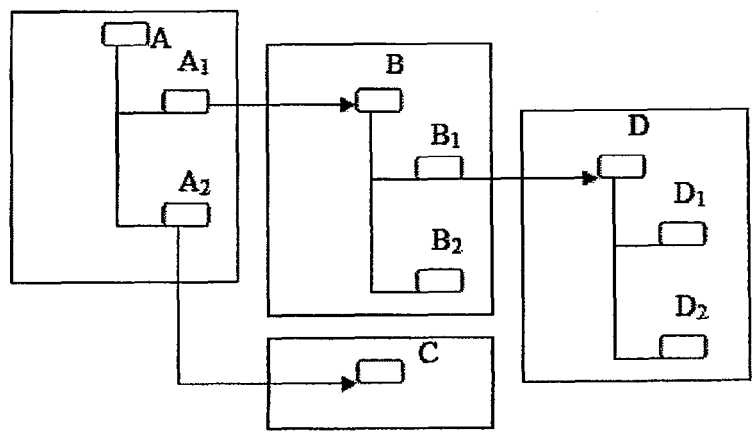
FIG. 7 is a block diagram of an example task delegation graph representing task delegation data according to an embodiment.

FIG. 7 is a block diagram of an example task delegation graph representing task delegation data according to an embodiment. Blocks denoted by A, B, C, and D represent a local root task or a collaborative task that may involve a participation of a requester and a recipient. Blocks denoted by $A_1, A_2, B_1, B_2, D_1, D_2$ represent sub-tasks of the corresponding collaborative tasks that may become a collaborative task sent to a further recipient. In an example, the collaborative tasks may be related to a process.

Such a delegation graph allows any party with the appropriate authorization to view collaborative tasks and add context information to a collaborative task. Therefore, a delegation graph may provide an easy to understand, efficient, and flexible knowledge management.

FIG. 8 is a code piece with example task metadata according to an embodiment. In the example, metadata is represented by meta content that is identifiable by the key word "META".

In an example, sending a collaborative task request may trigger a method that copies the complete content from the task request message to a new mail message and adds task metadata in HTML format. The generated new mail message may be a tracking message that is used to store the task data in the back end such as the task management server 200. The tracking message may be sent to the mail server 335 from where the back end will fetch the task information.

In the example, the metadata may sequentially identify in a first item content-type, in a second item the email of the collaborative task, in a third item the email type, in a fourth item an identifier of the request including a time stamp when the request was created concatenated with an identifier of the requester, and in following items identifiers allowing for an identification of the email within the tree of collaborative tasks and within the dialogue of a collaborative task. In task metadata of a response of a recipient an identifier of a requester may be substituted by an identifier of the recipient and the time stamps may be generated accordingly. Further items of the metadata may specify start date of the collaborative task of the collaborative task management (ctm) and a due date.

FIG. 9 is a code piece with an example description of a task pattern according to an embodiment.

A single task pattern may be defined in a XML file that describes the tasks tree structure and the context information. Multiple task patterns may be assembled in a single XML file that represents a task pattern repository structure. A task pattern repository description may be according to the code piece with the example description.

The content inside the task element <task></task> may describe a task pattern and may be stored in a separate task pattern document. The <delegation> element may store suggested delegates for the tasks and the <time> may store suggested execution time. To ensure compatibility formats for the task pattern and task pattern repository documents may be defined in a W3C endorsed grammar language (DTD or XML Schema). For the operations on remote task pattern repositories an interface may be specified between the front end, for example, the integrated task management client 100 and the back end, for example the task management server 200. The interface may be implemented as a XML web service provided within the task management server 200 and exposed to the front-end through the web service WSDL. The front end may have VB web service proxy classes generated on the WSDL of the web service and may call the repository methods through them. The interface may have methods that look like this: getRepositories( ), called on the client side in online mode to retrieve a string list with available unique repository identifiers of the remote task pattern repositories from the server. getTaskPatterns(String repositoryID), to return a XML task patterns structure as described above, including task patterns in the repository; the structure may be evaluated on the client side and different views of the patterns may be displayed; the repositoryID may be a unique name of the task pattern repository as delivered by the task management server for remote repositories. getTaskPatternNames(String repositoryID) to list the names of the task patterns in the repository; this may mean the names of the root tasks in the task patterns; such a method may decrease the overhead to deliver all repository data when names of the patterns are needed in the client view. addTaskPattern(String repositoryID, String content) to deliver the content of the task pattern in XML format, an error will be returned if a pattern with root task ID as the one contained in the content is already contained. removeTaskPattern(String repositoryID, String patternId) to remove the pattern with the given Id from the repository. replaceTaskPattern(String repositoryID, String patternId, String newContent) to replace the pattern with the given ID with the new content in the repository.

Additional methods may be supplied for delivering detailed task pattern information like last modified timestamp or author. The interface may be extended to deliver content that is described in the task pattern and task pattern repository XML schemas or DTDs. Data for the execution of the methods defined in the interface on back-end side may be supplied through the repository management plug-ins in the task management server 200 according to the repository type.

Such exemplary data structures may be used in a specific implementation of the application integration layer 140, the integrated task management client 100, the task management web client 340, the task management server 200, and the data storage system 222. The application integration layer 140 and the integrated task management client 100 may be implemented with a Microsoft Outlook COM Add-In developed in the Visual Basic language. The local task pattern repository may be a XML document in accordance with the code piece in FIG. 9. The task management web client 340 may be built with an Apache MyFaces implementation of Java Server Faces (JSF) for the personal task tree view and with a SAP JNet solution displaying the task trees with the delegation graph in a Java Applet. The task management server application of the task management server 200 may be a java EE enterprise application with EJB and Web modules. The task management server application may be deployed on a JBoss java application server with a MySQL database as data storage (DS). The mail server 355 may be an embedded JBoss Mail Server (JBMS). The web services of the task management server 200 may be implemented as XML based web services hosted on the JBoss server (jbossws). The web service clients of the integrated task management client 100 may use VB proxy classes that are generated based on the web service description language (WSDL) provided from the JBboss web services. The asynchronous information transfer may be executed via email over SMTP where the mails may include task meta-information embedded in HTML. The synchronous communication for browsing remote task pattern repositories may be done through the XML based web services over SOAP message exchange. The remote task patterns repository may be implemented as a file system repository with a file folder including multiple task pattern files on the server host. A repository manager for this repository may be implemented on the task management server 200 to read and write files to the repository and deliver the task pattern information to the integrated task management client 100 via web service SOAP exchange. Functionality for read-write access in compatible mode to the XML task pattern repository files may be added to the front-end, that is, the integrated task management client 100.

The integrated task management client 100 may provide extended task view by adding proprietary columns to display tree hierarchy and task attributes information. The integrated task management client 100 may add a toolbar with task specific actions for sending and handling received requests and displaying the task pattern repository explorer. The repository explorer may display task pattern repositories as trees by marking the local repositories and the remote repositories differently so the user may distinguish between them.

When a task pattern is opened the task pattern may be displayed in the task pattern editor view within the repository explorer. It may show in a split pane on one side the tree structure of the tasks in a pattern and on the other side the complete context information for the currently selected task. A task may be edited by changing information in the task context fields. A task may be moved within the pattern tree per drag and drop and handled through cut, copy, paste, or delete operations. Such operations may be provided through custom toolbar buttons and context menu.

The integrated task management client 100 may have an embedded implementation for parsing and saving task pattern XML files. The integrated task management client 100 may also have embedded support for reading complete task pattern repository XML files.

The task management web client 340 may deliver task view over HTTP connection or a HTTPS connection. The task management web client 340 may be implemented through a web application that may be deployed within the task management server application on the JBoss java application server. A task delegation graph may be implemented in java, where nodes and edges are described as java classes. Such classes may add solution specific attributes and provide proprietary extension. The task management web client 340 may be deployed with the task management application enterprise archive (ear) and use java EJBs deployed with the application to look up available tasks from the data storage. The looked up structures may be displayed via the JNet that may provide the graph view in a java applet. The view may be toggled to display the tasks delegation tree structure through an Apache MyFaces java server faces functionality embedded in the task management web client 340.

The task management server application may be a java enterprise application. It may be packed in an .ear archive and deployed to a JBoss java application server. The task management server application contains the web-module for the task management web client 340 and also enterprise java bean (EJB) components for the persistence of data in the data storage. The task management server 200 application may include web service components that are based on EJBs.

The task management server 200 may include a JBoss Mail Server (JBMS) to make extended use of its application programming interface (API) along with Java Mail for retrieving and resending email messages. The integrated task management client 100 may send task requests in form of tracking emails to nested JBMS. The task management server application may fetch an available unread message from the specified tracking-account and parse the embedded task meta content. The task information may be saved in the data store.

The task management server application may host web services for the integrated task management client 100. The web services may be XML based web services that expose JSR-181 EJB endpoints through the JBoss web service framework. The data may be delivered to the front-end over HTTP or HTTPS communication with SOAP messages.

A web service may provide the interface for the remote task repository operations and have a connector java class at which different repository managers (RM) may be registered. A web service may access all registered RM. Each RM may be specific for the repository type. An RM may serve multiple repositories of the same type. The RM may be responsible for the read/write access to the repository and for transmitting repository data to and from the repository web service in a compatible form. To ensure the compatibility, each RM may implement a java interface and deliver the repository data in the form of java objects as defined in the interface.

The java objects for communication may be for example: Task.java—a class representing a task item that may have collections with sub task items, a parent item, and various attributes. TaskPattern.java—with members like Task rootTask, versioning information like java.util.Date timestamp having the time of the last change and other information. TaskPatternRepository.java with class members String sId, String sDescription, and a collection of TaskPattern objects.

The IRepositoryManager interface may have following methods: public void refresh( ) to will read a configuration file when task pattern repositories for the given repository manager are specified; this will allow to dynamically detect emergence or disappearance of repositories and update the collection with available repositories for the manager. public void setFilter(java.util.Properties props) to construct a filter depending on the given properties; the filter may be evaluated during operations like 'get' operations, to restrict the access to certain repository information e.g. because of permissions issues. public java.util.Collection getTaskPatternRepositories( ) to return a collection with TaskPatternRepository instances corresponding to the task pattern repositories, registered on the repository manager. public java.util.Collection getTaskPatterns(String repositoryID) to return a collection with TaskPattern instances for the repository with the given ID. public int addTaskPattern(String repositoryID, TaskPattern pattern) to deliver a content of the task pattern as TaskPattern object; the object may be transformed by the repository manager and stored in the repository depending on the structure; the result could be a constant describing a status. public int removeTaskPattern(String repositoryID, String patternId) to remove the pattern with the given ID from the given repository. public int replaceTaskPattern(String repositoryID, TaskPattern pattern) to deliver content of the task pattern as TaskPattern object; the object may be transformed by the repository manager and stored in the repository on the place of the currently existing pattern with the pattern ID.

A repository manager may use such methods to deliver data from the repository to the repository management web service and to read out data from the web service and store data in the repository. The content may be delivered from the web service to the client and from the client to the web service in XML format. So the web service may have java classes that make transformations of the above described java objects like Task, TaskPattern and TaskPattern to task description XML structures and the other way around using the Document Object Model (DOM) implementation of java (package org.w3c.dom) that define the DOM programming interfaces for XML (and, optionally, HTML) documents, as specified by the W3C.

In addition to the repository management web service, the task management server application may be extended with web services for simple task update purposes like updating task status on server side in online mode etc.

FIG. 10A is a code piece with an example query in a database table of the data storage system 222 according to an embodiment. The data storage system 222 may be a MySQL database that is defined as a default data store for the JBoss server. The data from the java classes of the task management server 200 may be persisted to the DB by means of java 5.0 javax.persistence framework annotations that are supported by the EJB3.0 and the JBoss server. A task class may include the code piece with the exemplary query.

FIG. 10B is a code piece with an example data retrieval from a database table of the data storage system 222 according to an embodiment. The named queries may be accessed from methods of a stateless session bean to retrieve data from the database of the data storage system 222.

FIG. 10C is a code piece with an example retrieval of a task identifier from a database table of a data storage system according to an embodiment. A retrieval of a task identifier is an example for access of a common task attributes according to persistence annotations. The retrieval of a task identifier illustrates how a task ID is retrieved.

Figure 11:
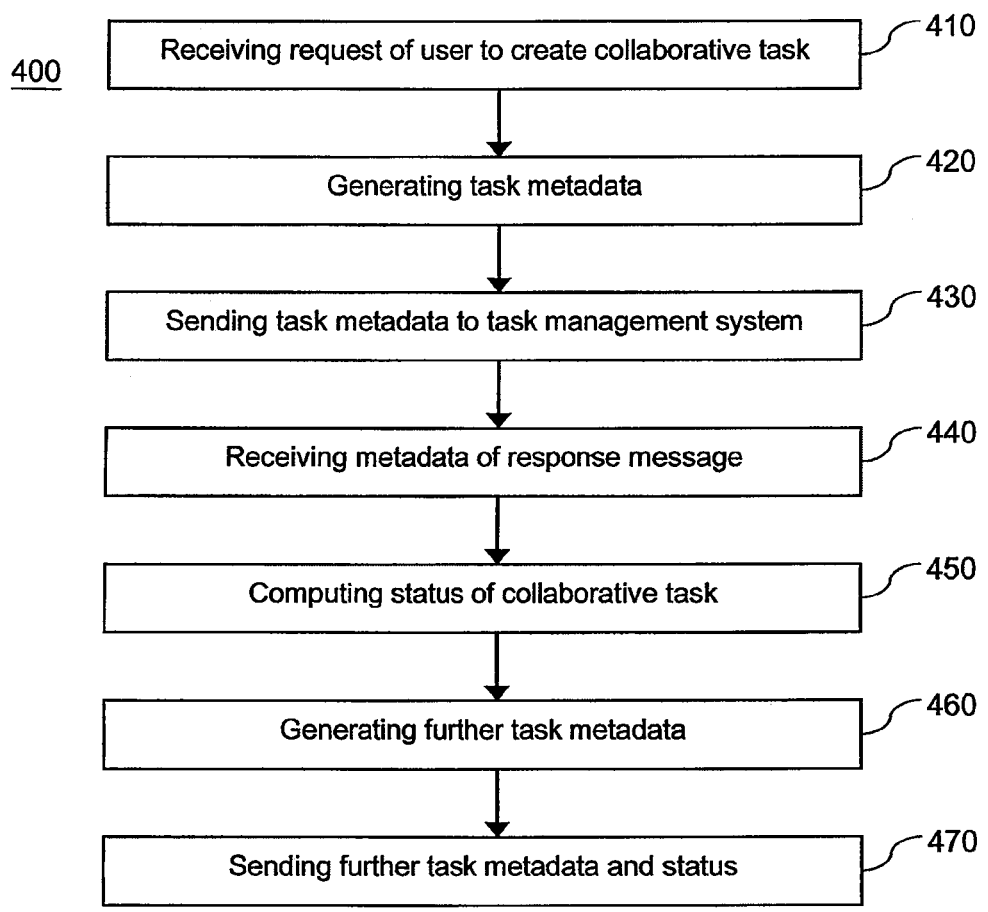
FIG. 11 is a flow diagram of an example method according to an embodiment.

FIG. 11 is a flow diagram of an example method according to an embodiment. The example method may be a computer-implemented method 400 for providing an identification of a collaborative task.

The method 400 may include operations receiving 410 a request of a user to create the collaborative task, generating 420 task metadata, and sending 430 the task metadata to a system such as the recipient system 300 (see FIG. 1).

The method 400 may include sending a message with the collaborative task to a party. The collaborative task including also an assignment of the party to the collaborative task and a description of the collaborative task.

Further operations may include receiving 440 metadata of a response message that has been sent by the party, computing 450 a status of the collaborative task from the metadata of the response message, generating 460 further task metadata, and sending 470 the further task metadata and the status of the collaborative task to the system.

The method may include receiving task metadata of a further collaborative task to which the user is assigned, receiving a response of the user to the further collaborative task, computing a status of the further collaborative task from the task metadata of the further collaborative task and the response of the user, and sending a status of the further collaborative task to the system.

Sending an identification of a selected process to a task management web client and receiving task delegation data from the task management web client may be operations of the method 400. The task delegation data may identify one or more collaborative tasks of the selected process and parties assigned to the one or more collaborative tasks.

The method 400 may include accessing a task pattern stored by a local repository, transforming the task pattern into a standard format, providing the task pattern in the standard format to the user, and adding data from the task pattern in the standard format to the metadata of the collaborative task in response to a selection of the user. The task pattern may identify a further process, a collaborative task of the further process, and a party assigned to the collaborative task of the further process.

Further operation may include accessing a web service of the system, sending a request of a task pattern to the web service, receiving the task pattern in a standard format, providing a representation of the task pattern in the standard format to the user, and adding data from the task pattern in the standard format to the metadata of the collaborative task in response to a selection of the user. The task pattern may identify a further process, a collaborative task of the further process, and a party assigned to the collaborative task of the further process.

Receiving 410 the request of the user may include transferring the request from an application system using an integration layer coupled to the application system. Sending 430 the task metadata to the system may include transferring the task metadata to the application system using the integration layer and adding the task metadata to a message that is sent by the application system. The message may be in a standard message format of the application system.

Sending 430 the task metadata of the collaborative task to the system may include accessing a web service of the system and transferring the task metadata of the collaborative task to the web service.

Further operations of method 400 may include accessing an external web service and receiving external service data from the external web service. The external service data may be a part of the collaborative task and may be any one of a group of computed results for a specified collaborative task. The group may include a cost calculation for the specified collaborative task, a calculation of a number of hours committed to the specified collaborative task, and a number of hours completed for the specified collaborative task.

Figure 12:
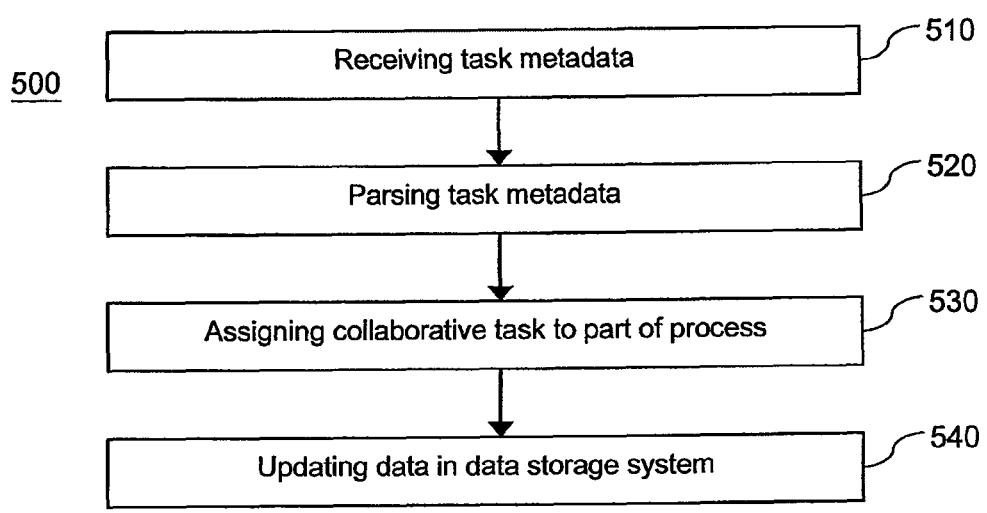
FIG. 12 is a flow diagram of a further example method according to an embodiment.

FIG. 12 is a flow diagram of a further example method according to an embodiment. The example method may be a computer-implemented method 500 for assigning a collaborative task to a process.

The method 500 may include receiving 510 task metadata of the collaborative task, parsing 520 the task metadata, assigning 530 the collaborative task to a part of the process, and updating 540 data that describe the process in a data storage system with data from the task metadata and with an assignment of the collaborative task to the part of the process.

The method 500 may further include sending the task metadata to a party that is assigned to the collaborative task, receiving an identification of the party, identifying the party by accessing data of the collaborative task stored in the data storage system, and modifying the task metadata by adding an assignment of the party to the collaborative task.

Sending the task metadata to the party may include sending a message in a standard message format to the party. The message may have an identification of a location to access a representation of the task metadata. Receiving the task metadata may include accessing a message communication system.

Further operations of the method 500 may include receiving an identification of a selected process from a task management web client, retrieving task delegation data from the data storage system using the identification of the selected process, and sending the task delegation data to the task management web client. The task delegation data may identify one or more collaborative tasks of the selected process and parties assigned to the one or more collaborative tasks.

The method 500 may further include providing a web service, receiving a request for a task pattern from a web service client connected to the web service, accessing the task pattern stored by a repository, transforming the task pattern into a standard format, and providing the task pattern in the standard format to the web service client. The task pattern may identify a further process, a collaborative task of the further process, and a party assigned to the collaborative task of the further process.

Receiving the task metadata of the collaborative task may include providing a web service and receiving the task data from a web service client connected to the web service.

Figure 13:
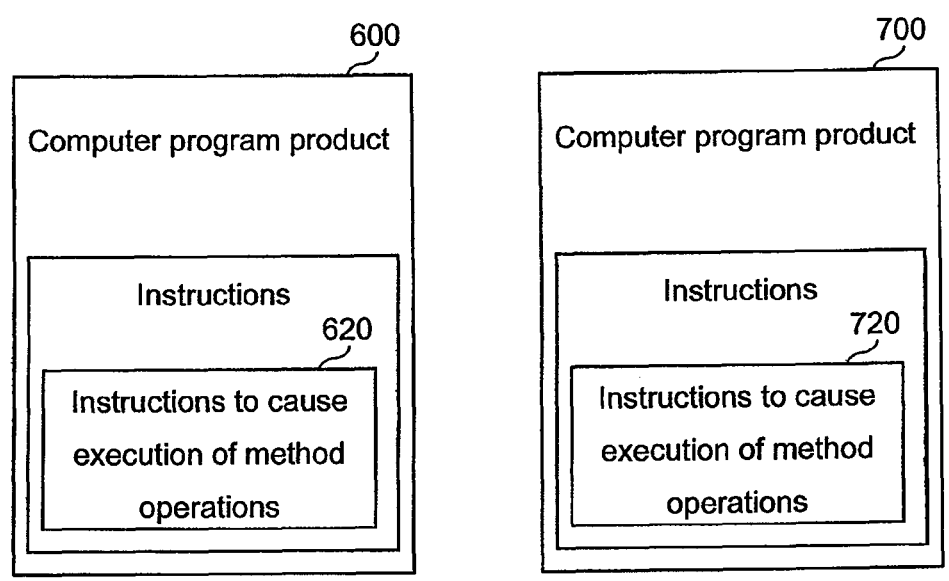
FIG. 13 is block diagram of example computer program products according to embodiments.

FIG. 13 is block diagram of example computer program products according to embodiments.

One of the example computer program products may be a computer program product 600 for providing an identification of a collaborative task. The computer program product 600 may include instructions 620 that are configured to cause a computer system to execute operations of the method 400.

A further of the example computer program products may be computer program product 700 for assigning a collaborative task to a process. The computer program product 700 may include instructions 720 that are configured to cause a computer system to execute operations of the method 500.

As noted above, example embodiments may include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer-executable instructions into the executable format and a second computer may execute the transformed instructions. The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, hardware implementations, or equipment for receiving manual inputs.

The invention claimed is:

1. A system comprising:
   a repository manager to access a task pattern and to transform the task pattern into a standard format;
   a communication unit to receive a request of a user to create a collaborative task and send task metadata to a further system; and
   a processing unit to
      generate the task metadata, the task metadata being a part of the collaborative task and identifying the collaborative task as a part of a process, and
      add data from the task pattern in the standard format to the metadata of the collaborative task, the task pattern identifying a further process and a collaborative task of the further process.

2. The system of claim 1, wherein the collaborative task further comprises a description of the collaborative task and an assignment of a party to the collaborative task and wherein the communication unit is configured to send a message with the collaborative task to the party.

3. The system of claim 2, wherein the communication unit is configured to receive metadata of a response message that has been sent by the party to the user and to send further task metadata and a status of the collaborative task to the further system and wherein the processing unit is configured to generate the further task metadata and to compute the status of the collaborative task from the metadata of the response message.

4. The system of claim 1, further comprising an integration layer that is configured to transfer the request of the user from an application system to the communication unit and to transfer the task metadata from the communication unit to the application system.

5. The system of claim 4, wherein the application system is configured to send messages in a standard message format to a party that is assigned to the collaborative task and wherein the integration layer is configured to add the task metadata of the collaborative task to a message sent by the application system.

6. The system of claim 1, wherein the communication unit is configured to receive task metadata of a further collaborative task to which the user is assigned, to receive a response of the user to the further collaborative task, and to send a status of the further collaborative task to the further system and wherein the processing unit is configured to compute the status of the further collaborative task from the task metadata of the further collaborative task and the response of the user.

7. The system of claim 1, wherein the communication unit is configured to send an identification of a selected process to a task management web client and to receive task delegation data from the task management web client, the task delegation data identifying one or more collaborative tasks of the selected process and parties assigned to the one or more collaborative tasks.

8. The system of claim 1, further comprising a repository manager being configured to access the task pattern stored by a local repository and wherein the communication unit is configured to provide the task pattern in the standard format to the user, the task pattern identifying a party assigned to the collaborative task of the further process.

9. The system of claim 1, wherein the communication unit comprises a first web service client that is configured to access a first web service of the further system, to send a request of a task pattern to the first web service, and to receive the task pattern in a standard format, wherein the communication unit is configured to provide a representation of the task pattern in the standard format to the user and the processing unit is configured to add data from the task pattern in the standard format to the metadata of the collaborative task in response to a selection of the user, the task pattern identifying a further process, a collaborative task of the further process and a party assigned to the collaborative task of the further process.

10. The system of claim 1, the communication unit comprising a second web service client that is configured to access a second web service of the further system and to transfer the task metadata of the collaborative task from the communication unit to the further system.

11. The system of claim 1, the communication unit comprising a third web service client that is configured to access an external web service and to receive external service data from the external web service, the external service data being a part of the collaborative task and being any one of a group of computed results for a specified collaborative task: a cost calculation for the specified collaborative task, a calculation of a number of hours committed to the specified collaborative task, and a number of hours completed for the specified collaborative task.

12. A computer-implemented method, the method comprising:
   receiving a request of a user to create a collaborative task;
   generating task metadata, the task metadata being a part of the collaborative task and identifying the collaborative task as a part of a process;
   accessing a task pattern;
   transforming the task pattern into a standard format;
   adding data from the task pattern in the standard format to the metadata of the collaborative task, the task pattern identifying a further process and a collaborative task of the further process; and
   sending the task metadata to a system.

13. The method of claim 12, further comprising sending a message with the collaborative task to a party, an assignment of the party to the collaborative task and a description of the collaborative task being further parts of the collaborative task.

14. The method of claim 13, further comprising: receiving metadata of a response message that has been sent by the party, computing a status of the collaborative task from the metadata of the response message, generating further task metadata, and sending the further task metadata and the status of the collaborative task to the system.

15. The method of claim 12, further comprising: receiving task metadata of a further collaborative task to which the user is assigned, receiving a response of the user to the further collaborative task, computing a status of the further collaborative task from the task metadata of the further collaborative task and the response of the user, and sending a status of the further collaborative task to the system.

16. The method of claim 12, further sending an identification of a selected process to a task management web client and receiving task delegation data from the task management web client, the task delegation data identifying one or more collaborative tasks of the selected process and parties assigned to the one or more collaborative tasks.

17. The method of claim 12, further comprising: accessing the task pattern stored by a local repository, the adding of the data from the task pattern to the metadata of the collaborative task being in response to a selection of the user, the task pattern identifying a party assigned to the collaborative task of the further process.

18. The method of claim 12, further comprising accessing a first web service of the system, sending a request of a task pattern to the first web service, receiving the task pattern in a standard format, providing a representation of the task pattern in the standard format to the user, and adding data from the task pattern in the standard format to the metadata of the collaborative task in response to a selection of the user, the task pattern identifying a further process, a collaborative task of the further process and a party assigned to the collaborative task of the further process.

19. The method of claim 12, wherein receiving the request of the user comprises transferring the request from an application system using an integration layer coupled to the application system and wherein sending the task metadata to the system comprises transferring the task metadata to the application system using the integration layer and adding the task metadata to a message that is sent by the application system, the message being in a standard message format of the application system.

20. The method of claim 12, wherein sending the task metadata of the collaborative task to the system comprises accessing a second web service of the system and transferring the task metadata of the collaborative task to the second web service.

21. The method of claim 12, further comprising accessing an external web service and receiving external service data from the external web service, the external service data being a part of the collaborative task and being any one of a group of computed results for a specified collaborative task: a cost calculation for the specified collaborative task, a calculation of a number of hours committed to the specified collaborative task, and a number of hours completed for the specified collaborative task.

22. A machine-readable non-transitory storage medium having instruction data to cause a machine to:
- access a task pattern and to transform the task pattern into a standard format;
- receive a request of a user to create the collaborative task and send task metadata to a further system;
- generate the task metadata, the task metadata being a part of the collaborative task and identifying the collaborative task as a part of a process; and
- add data from the task pattern in the standard format to the metadata of the collaborative task, the task pattern identifying a further process and a collaborative task of the further process.

* * * * *

UNITED STATES PATENT AND TRADEMARK OFFICE
CERTIFICATE OF CORRECTION

| | |
|---|---|
| PATENT NO. | : 9,165,283 B2 |
| APPLICATION NO. | : 12/137401 |
| DATED | : October 20, 2015 |
| INVENTOR(S) | : Scheidl et al. |

It is certified that error appears in the above-identified patent and that said Letters Patent is hereby corrected as shown below:

On the title page, in item (75), in "Inventors", in column 1, line 3, delete "Karlsruhe (DE)" and insert --Bern (CH)--, therefor On the title page, in item (30), in "Foreign Application Priority Data", in column 1, line 1, delete "07011575" and insert --07011575.3--, therefor In column 1, line 9, delete "Jun. 15, 2007," and insert --Jun. 13, 2007,--, therefor Signed and Sealed this
Fifth Day of July, 2016

Michelle K. Lee
*Director of the United States Patent and Trademark Office*